United States Patent
Takahashi (10) Patent No.: US 11,130,498 B2
(45) Date of Patent: Sep. 28, 2021

(54) MOTOR VEHICLE

(71) Applicant: TOYOTA JIDOSHA KABUSHIKI KAISHA, Toyota (JP)

(72) Inventor: Yoshimitsu Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 499 days.

(21) Appl. No.: 16/181,670

(22) Filed: Nov. 6, 2018

(65) Prior Publication Data

US 2019/0135297 A1 May 9, 2019

(30) Foreign Application Priority Data

Nov. 7, 2017 (JP) .............................. JP2017-214355

(51) Int. Cl.
| | | |
|---|---|---|
| *B60W 40/105* | (2012.01) | |
| *B60W 30/18* | (2012.01) | |
| *B60W 10/184* | (2012.01) | |
| *B60W 10/08* | (2006.01) | |
| *B60W 10/119* | (2012.01) | |
| *B60W 20/00* | (2016.01) | |
| *B60W 30/14* | (2006.01) | |

(52) U.S. Cl.
CPC .......... *B60W 40/105* (2013.01); *B60W 10/08* (2013.01); *B60W 10/119* (2013.01); *B60W 10/184* (2013.01); *B60W 20/00* (2013.01); *B60W 30/146* (2013.01); *B60W 30/18063* (2013.01); *B60W 30/18109* (2013.01); *B60W 2510/081* (2013.01); *B60W 2520/28* (2013.01); *B60W 2710/083* (2013.01)

(58) Field of Classification Search
None
See application file for complete search history.

(56) References Cited

U.S. PATENT DOCUMENTS

| | | | |
|---|---|---|---|
| 2004/0147366 A1* | 7/2004 | Aoki .................... | B60K 28/165 477/6 |
| 2008/0190680 A1* | 8/2008 | Kaneko ............... | B60L 15/2009 180/170 |
| 2010/0256847 A1 | 10/2010 | Kimbara et al. | |

(Continued)

FOREIGN PATENT DOCUMENTS

| | | |
|---|---|---|
| JP | 11-11290 A | 1/1999 |
| JP | 2009-173092 A | 8/2009 |

(Continued)

*Primary Examiner* — Jonathan M Dager
(74) *Attorney, Agent, or Firm* — Sughrue Mion, PLLC (57) ABSTRACT

A motor vehicle sets a front wheel average rotation speed that is an average rotation speed of left and right front wheels, based on a rotation speed of a first motor, and sets a rear wheel average rotation speed that is an average rotation speed of left and right rear wheels, based on a rotation speed of a second motor. When a difference between the front wheel average rotation speed and the rear wheel average rotation speed is larger than a first reference value, the motor vehicle sets a vehicle body speed, based on the lower between the front wheel average rotation speed and the rear wheel average rotation speed. The motor vehicle compares a difference between the vehicle body speed and the wheel speed of each wheel, with a second reference value and thereby determines whether the wheel idles.

7 Claims, 5 Drawing Sheets

(56) References Cited

U.S. PATENT DOCUMENTS

| | | | |
|---|---|---|---|
| 2018/0264947 A1* | 9/2018 | Suzuki | B60L 3/0061 |
| 2019/0291591 A1* | 9/2019 | Suzuki | B60L 15/20 |
| 2020/0189398 A1* | 6/2020 | Suzuki | B60L 15/2009 |
| 2020/0259431 A1* | 8/2020 | Sawada | B60L 50/60 |
| 2020/0398844 A1* | 12/2020 | Ruybal | B60W 10/119 |

FOREIGN PATENT DOCUMENTS

| | | |
|---|---|---|
| JP | 2011-088492 A | 5/2011 |
| JP | 2014-155346 A | 8/2014 |

* cited by examiner

MOTOR VEHICLE

CROSS-REFERENCE TO RELATED APPLICATIONS

The present disclosure claims priority to Japanese Patent Application No. 2017-214355 filed Nov. 7, 2017, which is incorporated herein by reference in its entirety including specification, drawings and claims.

TECHNICAL FIELD

The present disclosure relates to a motor vehicle and more specifically to a motor vehicle including a first motor that is connected with left and right front wheels via a first differential gear and a second motor that is connected with left and right rear wheels via a second differential gear.

BACKGROUND

A proposed configuration of the motor vehicle uses wheel speed sensors respectively mounted to left and right front wheels and to left and right rear wheels and sets an estimated vehicle body speed, based on the respective wheel speeds detected by respective wheel speed sensors (as described in, for example, H11-11290A).

SUMMARY

Electromagnetic pickup-type rotation speed sensors are often employed as the wheel speed sensors. As is known in the art, these electromagnetic pickup-type rotation speed sensors decrease their detection accuracies of the wheel speeds at a very low vehicle body speed or at a vehicle stop. As a result, this is likely to decrease the accuracy of setting the estimated vehicle body speed and thereby decrease the accuracy of determining whether each wheel idles or not using the respective wheel speeds of the left and right front wheels and the left and right rear wheels and the estimated vehicle body speed, at a very low vehicle body speed or at a vehicle stop.

A motor vehicle of the present disclosure mainly aims to provide the high accuracy of detection of whether each wheel out of left and right front wheels and left and right rear wheels idles or not even at a very low vehicle body speed or at a vehicle stop.

In order to achieve the above primary object, the motor vehicle of the present disclosure employs the following configuration.

The present disclosure is directed to a motor vehicle. The motor vehicle includes a first motor connected with left and right front wheels via a first differential gear, a second motor connected with left and right rear wheels via a second differential gear, a wheel speed detector configured to detect a wheel speed of each wheel out of the left and right front wheels and the left and right rear wheels, a rotation speed detector configured to allow for detection with higher accuracy up to a range having a smaller absolute value compared with the wheel speed detector and configured to detect rotation speeds of the first motor and of the second motor and a control device configured to control the first motor and the second motor. The control device sets a front wheel average rotation speed that is an average rotation speed of the left and right front wheels, based on the rotation speed of the first motor, and sets a rear wheel average rotation speed that is an average rotation speed of the left and right rear wheels, based on the rotation speed of the second motor. When a difference between the front wheel average rotation speed and the rear wheel average rotation speed is larger than a first reference value, the control device sets a vehicle body speed, based on lower between the front wheel average rotation speed and the rear wheel average rotation speed. The control device compares a difference between the wheel speed of each wheel and the vehicle body speed with a second reference value and thereby determines whether the wheel idles.

The motor vehicle of this aspect sets the front wheel average rotation speed that is the average rotation speed of the left and right front wheels (i.e., ½ of the sum of the rotation speed of the left front wheel and the rotation speed of the right front wheel), based on the rotation speed of the first motor detected by the rotation speed detector, and sets the rear wheel average rotation speed that is the average rotation speed of the left and right rear wheels (i.e., ½ of the sum of the rotation speed of the left rear wheel and the rotation speed of the right rear wheel), based on the rotation speed of the second motor detected by the rotation speed detector. When the difference between the front wheel average rotation speed and the rear wheel average rotation speed is larger than the first reference value, the motor vehicle of this aspect sets the vehicle body speed, based on the lower between the front wheel average rotation speed and the rear wheel average rotation speed. This configuration enables the vehicle body speed to be set with high accuracy even at a very low vehicle body speed or at a vehicle stop (i.e., when the wheel speed detector decreases its detection accuracy of the wheel speed of each wheel). The motor vehicle of this aspect compares the difference between the vehicle body speed and the wheel speed of each wheel out of the left and right front wheels and the left and right rear wheels, with the second reference value and thereby determines whether the wheel idles. This configuration sets the vehicle body speed with high accuracy and thereby allows for highly accurate determination of whether each wheel idles or not, even at a very low vehicle body speed or at a vehicle stop. The idling wheel, i.e., the wheel which idles, has the increased actual wheel speed. This configuration accordingly enables the wheel speed of the idling wheel to be detected with high accuracy by the wheel speed detector.

DESCRIPTION OF EMBODIMENTS

The following describes some aspects of the disclosure with reference to embodiments.

Figure 1:
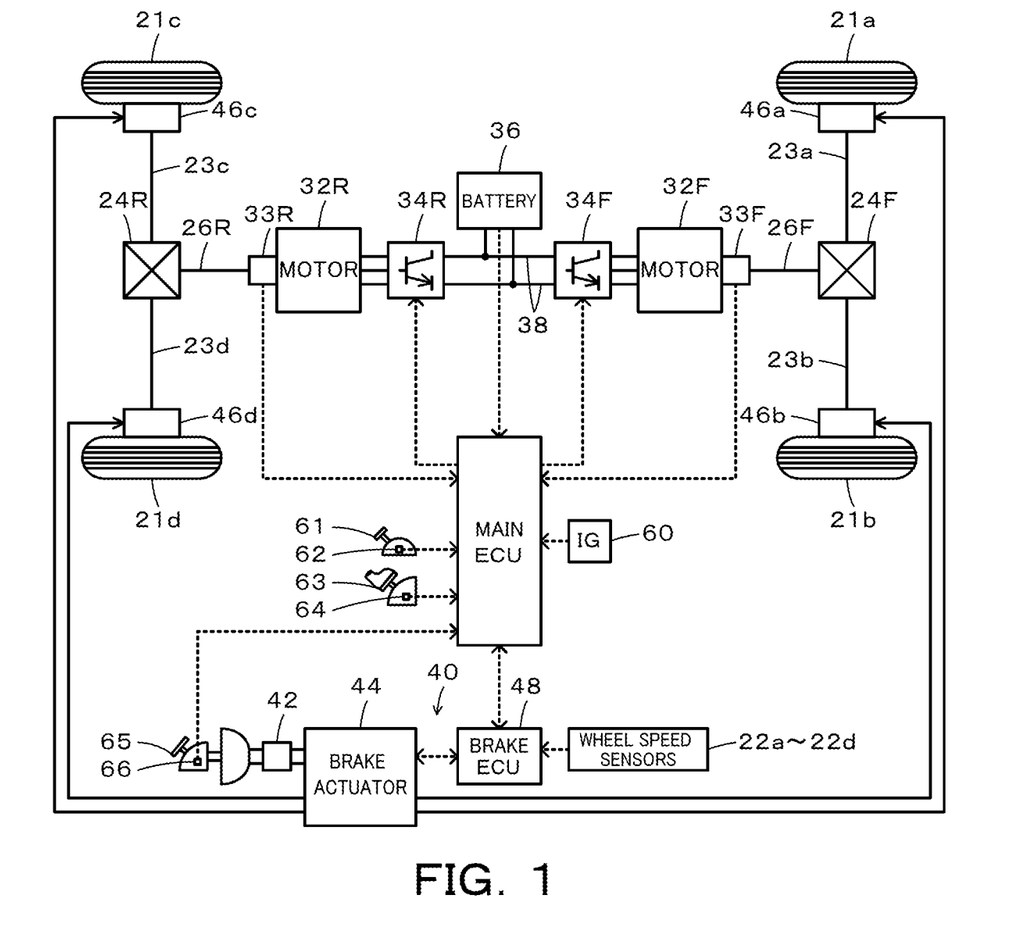
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. The electric vehicle 20 of the embodiment includes motors 32F and 32R, inverters 34F and 34R, a battery 36, a hydraulic brake system 40 serving as a braking force application device, and a main electronic control unit (hereinafter referred to as "main ECU") 50.

The motor 32F is configured as a synchronous generator motor including a rotor with permanent magnets embedded therein and a stator with three-phase coils wound thereon. The rotor of the motor 32F is connected with a driveshaft 26F that is coupled with left and right front wheels (left front wheel and right front wheel) 21a and 21b via axles 23a and 23b and a differential gear 24F. The motor 32R is configured as a synchronous generator motor like the motor 32F. A rotor of the motor 32R is connected with a driveshaft 26R that is coupled with left and right rear wheels (left rear wheel and right rear wheel) 21c and 21d via axles 23c and 23d and a differential gear 24R. The inverters 34F and 34R are used to drive the motors 32F and 32R and are connected with the battery 36 via power lines 38. The main ECU 50 performs switching control of a plurality of switching elements (not shown) included in the respective inverters 34F and 34R, so as to rotate and drive the motors 32F and 32R.

The battery 36 is configured as, for example, a lithium ion rechargeable battery or a nickel metal hydride battery and is connected with the inverters 34F and 34R via the power lines 38 as described above.

The hydraulic brake system 40 includes brake wheel cylinders 46a, 46b, 46c and 46d mounted to the front wheels 21a and 21b and to the rear wheels 21c and 21d, and a brake actuator 44. The brake actuator 44 is configured as an actuator to regulate the hydraulic pressures of the brake wheel cylinders 46a, 46b, 46c and 46d and apply braking forces to the front wheels 21a and 21b and to the rear wheels 21c and 21d. This brake actuator 44 is driven and controlled by a brake electronic control unit (hereinafter referred to as "brake ECU") 48.

The brake ECU 48 is configured as a CPU-based microprocessor and includes a ROM configured to store processing programs, a RAM configured to temporarily store data, input/output ports and a communication port, in addition to the CPU, although not being specifically illustrated. Signals from various sensors required to drive and control the brake actuator 44 are input into the brake ECU 48 via the input port. The signals input into the brake ECU 48 include a master cylinder pressure (brake pedal force) from a pressure sensor (not shown) mounted to a master cylinder 42 configured to generate a pressure according to the driver's depression of a brake pedal 65 and wheel speeds Vwa, Vwb, Vwc and vwd of the front wheels 21a and 21b and the rear wheels 21c and 21d from wheel speed sensors 22a, 22b, 22c and 22d respectively mounted to the front wheels 21a and 21b and the rear wheels 21c and 21d. The brake ECU 48 outputs, for example, a drive control signal to the brake actuator 44 via the output port. The brake ECU 48 is connected with the main ECU 50 via the respective communication ports.

The main ECU 50 is configured as a CPU-based microprocessor and includes a ROM configured to store processing programs, a RAM configured to temporarily store data, input/output ports and a communication port, in addition to the CPU, although not being specifically illustrated. Signals from various sensors are input into the main ECU 50 via the input port. The signals input into the main ECU 50 include, for example, rotational positions θmf and θmr of the rotors of the motors 32F and 32R from rotational position detection sensors 33F and 33R respectively mounted to the rotors of the motors 32F and 32R and phase currents Iuf, Ivf, Iwf, Iur, Ivr and Iwr of the respective phases of the motors 32F and 32R from current sensors (not shown) mounted to power lines of the respective phases of the motors 32F and 32R. The input signals also include a voltage Vb of the battery 36 from a voltage sensor (not shown) placed between terminals of the battery 36 and an electric current Ib of the battery 36 from a current sensor (not shown) mounted to an output terminal of the battery 36. The input signals further include an ignition signal from an ignition switch 60 and a shift position SP from a shift position sensor 62 configured to detect an operating position of a shift lever 61. Additionally, the input signals include an accelerator position Acc from an accelerator pedal position sensor 64 configured to detect the driver's depression amount of an accelerator pedal 63 and a brake pedal position BP from a brake pedal position sensor 66. The main ECU 50 outputs, for example, switching control signals to the plurality of switching elements included in the respective inverters 34F and 34R via the output port. The main ECU 50 calculates electrical angles θef and θer and rotation speeds Nmf and Nmr of the motors 32F and 32R, based on the rotational positions θmf and θmr of the rotors of the motors 32F and 32R input from the rotational position detection sensors 33F and 33R.

The wheel speed sensors 22a, 22b, 22c and 22d are configured by electromagnetic pickup-type rotation speed sensors and decrease their detection accuracies of the wheel speeds Vwa, Vwb, Vwc and Vwd of the front wheels 21a and 21b and the rear wheels 21c and 21d at a very low vehicle body speed or at a vehicle stop. The rotational position detection sensors 33F and 33R are configured by resolvers and allow for detection of the rotational positions θmf and θmr of the rotors of the motors 32F and 32R with high accuracy and calculation of the rotation speeds Nmf and Nmr of the motors 32F and 32R with high accuracy even at a very low vehicle body speed or at a vehicle stop.

In the electric vehicle 20 of the embodiment having the configuration described above, the main ECU 50 basically performs basic driving control described below. In the basic driving control, the main ECU 50 sets the third highest wheel speed among the wheel speeds Vwa, Vwb, Vwc and Vwd of the front wheels 21a and 21b and the rear wheels 21c and 21d to a vehicle body speed V, and sets a required torque Td* that is required for driving, based on the accelerator position Acc and the vehicle body speed V. The main ECU 50 subsequently sets torque distribution ratios Df and Dr (Df+Dr=1) that are torque rates of the front wheels 21a and 21b and of the rear wheels 21c and 21d to the required torque Td*, based on, for example, the accelerator position Acc and the vehicle body speed V, sets products of the required torque Td* and the respective torque distribution ratios Df and Dr to required torques Tf* and Tr* that are required for the front wheels 21a and 21b and for the rear wheels 21c and 21d, and sets products of the set required torques Tf* and Tr* and gear ratios (differential ratios) Gf and Gr of the differential gears 24F and 24R to torque commands Tmf* and Tmr* of the motors 32F and 32R. The main ECU 50 then performs switching control of the plurality of switching elements included in the respective inverters 34F and 34R, such as to drive the motors 32F and 32R with the set torque commands Tmf* and Tmr*.

In the electric vehicle 20 of the embodiment, in an accelerator-on state, the brake ECU 48 performs traction control (TRC) as needed basis to suppress the front wheels 21a and 21b and the rear wheels 21c and 21d from idling (slipping).

Figure 2:
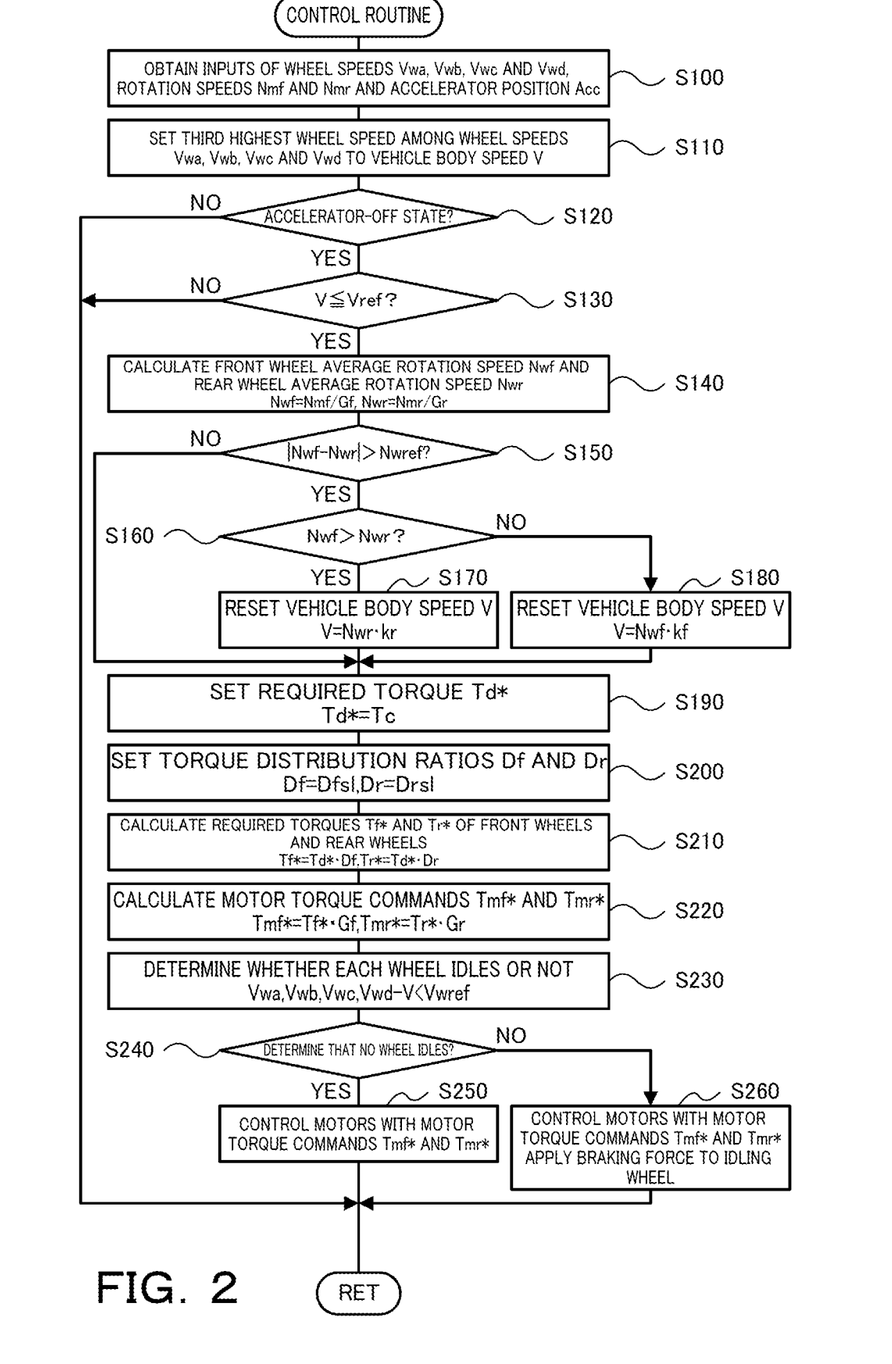
FIG. 2 is a flowchart showing one example of a control routine performed by the main ECU.

The following describes the operations of the electric vehicle 20 of the embodiment having the above configuration and especially a series of operations in an accelerator-off state and at a very low vehicle body speed or at a vehicle stop or more specifically a series of operations when the traction control is not performed and the wheel speed sensors 22a, 22b, 22c and 22d decrease their detection accuracies of the wheel speeds Vwa, Vwb, Vwc and Vwd of the front wheels 21a and 21b and the rear wheels 21c and 21d. FIG. 2 is a flowchart showing one example of a control routine performed by the main ECU 50. This routine is performed repeatedly.

When the control routine of FIG. 2 is triggered, the main ECU 50 first obtains input data, for example, the wheel speeds Vwa, Vwb, Vwc and Vwd of the front wheels 21a and 21b and the rear wheels 21c and 21d, the rotation speeds Nmf and Nmr of the motors 32F and 32R and the accelerator position Acc (step S100). The wheel speeds Vwa, Vwb, Vwc and Vwd of the front wheels 21a and 21b and the rear wheels 21c and 21d are values detected by the wheel speed sensors 22a, 22b, 22c and 22d and are input from the brake ECU 48 by communication. The rotation speed Nmf and Nmr of the motors 32F and 32R are input as values calculated based on the rotational positions θmf and θmr of the rotors of the motors 32F and 32R detected by the rotational position detection sensors 33F and 33R. The accelerator position Acc is input as a value detected by the accelerator pedal position sensor 64.

After obtaining the input data, the main ECU 50 sets the third highest wheel speed among the wheel speeds Vwa, Vwb, Vwc and Vwd of the front wheels 21a and 21b and the rear wheels 21c and 21d to the vehicle body speed V (step S110).

The main ECU 50 subsequently determines whether the current state is the accelerator-off state or the accelerator-on state (step S120) and compares the set vehicle body speed V with a reference value Vref (step S130). The reference value Vref denotes a threshold value used to determine whether the electric vehicle 20 is at a very low vehicle body speed or at a vehicle stop. The reference value Vref is determined as an upper limit of a vehicle body speed range outputting a creep torque in the accelerator-off state and may be, for example, 5 km/h, 6 km/h or 7 km/h. The processing of steps S120 and S130 is a process of determining whether the traction control is not performed and whether the wheel speed sensors 22a, 22b, 22c and 22d decrease their detection accuracies of the wheel speeds Vwa, Vwb, Vwc and Vwd of the front wheels 21a and 21b and the rear wheels 21c and 21d.

When it is determined that the current state is the accelerator-on state at step S120 or when the vehicle body speed V is higher than the reference value Vref at step S130, the main ECU 50 terminates this routine. In this case, the basic driving control described above and the traction control as needed basis are performed.

When it is determined that the current state is the accelerator-off state at step S120 and the vehicle body speed V is equal to or lower than the reference value Vref at step S130, the main ECU 50 calculates a front wheel average rotation speed Nwf that is an average rotation speed of the front wheels 21a and 21b (½ of the sum of the rotation speed of the left front wheel and the rotation speed of the right front wheel) and a rear wheel average rotation speed Nwr that is an average rotation speed of the rear wheels 21c and 21d (½ of the sum of the rotation speed of the left rear wheel and the rotation speed of the right rear wheel) (step S140). The front wheel average rotation speed Nwf may be calculated by dividing the rotation speed Nmf of the motor 32F by the gear ratio (differential ratio) Gf of the differential gear 24F. The rear wheel average rotation speed Nwr may be calculated by dividing the rotation speed Nmr of the motor 32R by the gear ratio (differential ratio) Gr of the differential gear 24R.

After calculating the front wheel average rotation speed Nwf and the rear wheel average rotation speed Nwr, the main ECU 50 compares a difference (|Nwf−Nwr|) between the front wheel average rotation speed Nwf and the rear wheel average rotation speed Nwr with a reference value Nwref (step S150). The reference value Nwref is a threshold value used to determine whether any wheel out of the front wheels 21a and 21b and the rear wheels 21c and 21d idles and may be, for example, 2 km/h, 3 km/h or 4 km/h. For example, when the front wheel 21a idles to increase an actual wheel speed of the front wheel 21a, this increases the front wheel average rotation speed Nwf and causes the difference (|Nwf−Nwr|) to become greater than the reference value Nwref. When the difference (|Nwf−Nwr|) is equal to or smaller than the reference value Nwref, the main ECU 50 determines that no wheel out of the front wheels 21a and 21b and the rear wheels 21c and 21d idles and does not reset the vehicle body speed V (i.e., does not perform the processing of steps S160 to S180 described below).

When the difference (|Nwf−Nwr|) is larger than the reference value Nwref at step S150, the main ECU 50 determines that some wheel out of the front wheels 21a and 21b and the rear wheels 21c and 21d idles and compares the front wheel average rotation speed Nwf with the rear wheel average rotation speed Nwr (step S160). The processing of step S160 is a process of determining whether the idling wheel, i.e., the wheel which idles, belongs to the front wheels 21a and 21b or belongs to the rear wheels 21c and 21d.

When the front wheel average rotation speed Nwf is higher than the rear wheel average rotation speed Nwr at step S160, the main ECU 50 determines that the idling wheel belongs to the front wheels 21a and 21b and resets a product of the rear wheel average rotation speed Nwr and a conversion factor kr as the vehicle body speed V (step S170). When the rear wheel average rotation speed Nwr is higher than the front wheel average rotation speed Nwf, on the other hand, the main ECU 50 determines that the idling wheel belongs to the rear wheels 21c and 21d and resets a product of the front wheel average rotation speed Nwf and a conversion factor kf as the vehicle body speed V (step S180).

The processing of steps S150 to S180 is a process of resetting the vehicle body speed V, based on the lower between the front wheel average rotation speed Nwf and the rear wheel average rotation speed Nwr (i.e., the rotation speed of the non-idling side which does not include the idling wheel), when the difference (|Nwf−Nwr|) is larger than the reference value Nwref. The conversion factor kr denotes a coefficient used to convert the rear wheel average rotation speed Nwr into the vehicle body speed V and is determined, based on a tire dynamic load radius of the rear wheels 21c and 21d. The conversion factor kf denotes a coefficient used to convert the front wheel average rotation speed Nwf into the vehicle body speed V and is determined, based on a tire dynamic load radius of the front wheels 21a and 21b.

This series of processing resets the vehicle body speed V, based on the front wheel average rotation speed Nwf and the rear wheel average rotation speed Nwr. This enables the vehicle body speed V to be set (or reset) with high accuracy even at a very low vehicle body speed or at a vehicle stop (i.e., when the wheel speed sensors 22a, 22b, 22c and 22d decrease their detection accuracies of the wheel speeds Vwa, Vwb, Vwc and Vwd of the front wheels 21a and 21b and the rear wheels 21c and 21d).

The main ECU 50 subsequently sets an ordinary creep torque Tc to the required torque Td* (step S190), sets values Dfs1 and Drs1 on the basis of static load gravity center (i.e., the center of gravity of the vehicle at a vehicle stop) and the like, to the torque distribution ratios Df and Dr (step S200), and sets products of the required torque Td* and the torque distribution ratios Df and Dr to the required torques Tf* and Tr* (step S210). The main ECU 50 subsequently sets respective products of the set required torques Tf* and Tr* and the gear ratios (differential ratios) Gf and Gr of the differential gears 24F and 24R to the torque commands Tmf* and Tmr* of the motors 32F and 32R (step S220).

The main ECU 50 subsequently compares respective values (Vwa−V), (Vwb−V), (Vwc−V) and (Vwd−V) obtained by subtracting the vehicle body speed V from the respective wheel speeds Vwa, Vwb, Vwc and Vwd of the front wheels 21a and 21b and of the rear wheels 21c and 21d with a reference value Vwref (steps S230 and S240). The reference value Vwref is a threshold value used to determine whether each wheel out of the front wheels 21a and 21b and the rear wheels 21c and 21d idles. The reference value Vwref may be a lower limit of a wheel speed range that ensures the detection accuracies of the wheel speeds Vwa, Vwb, Vwc and Vwd of the front wheels 21a and 21b and the rear wheels 21c and 21d by the wheel speed sensors 22a, 22b, 22c and 22d (i.e., that can determine whether each wheel idles even at the vehicle body speed V equal to value 0) or a slightly higher value than the lower limit and may be, for example, 8 km/h, 9 km/h or 10 km/h. According to the embodiment, the vehicle body speed V can be set with high accuracy as described above. The processing of steps S230 and S240 accordingly allows for determination of whether each wheel idles with high accuracy even at a very low vehicle body speed or at a vehicle stop. The idling wheel, i.e., the wheel which idles (i.e., the wheel having the value obtained by subtracting the vehicle body speed V from the wheel speed that is larger than the reference value Vwref) has the increased actual wheel speed. The wheel speed of the idling wheel can thus be detected with high accuracy by the wheel speed sensor.

When it is determined that all the values (Vwa−V), (Vwb−V), (Vwc−V) and (Vwd−V) are equal to or smaller than the reference value Vwref at steps S230 and S240, the main ECU 50 determines that no wheel out of the front wheels 21a and 21b and the rear wheels 21c and 21d idles. The main ECU 50 performs switching control of the plurality of switching elements included in the inverters 34F and 34R, such as to drive the motors 32F and 32R with the torque commands Tmf* and Tmr* (step S250) and then terminates this routine.

When it is determined that any of the values (Vwa−V), (Vwb−V), (Vwc−V) and (Vwd−V) is larger than the reference value Vwref at steps S230 and S240, on the other hand, the main ECU 50 determines that some wheel out of the front wheels 21a and 21b and the rear wheels 21c and 21d idles. The main ECU 50 performs switching control of the plurality of switching elements included in the inverters 34F and 34R, such as to drive the motors 32F and 32R with the torque commands Tmf* and Tmr* and additionally controls the hydraulic brake system 40 to apply a braking force to the idling wheel (step S260) and then terminates this routine.

In the case where the vehicle body speed V is approximately equal to the value 0 and where the current state is the accelerator-off state, when any wheel out of the front wheels 21a and 21b and the rear wheels 21c and 21d drops, for example, in a ditch of the road to idle, the actual wheel speed of the idling wheel is increased by the torque of the idling wheel, irrespective of no significant change in the vehicle body speed V. The actual wheel speed of the idling wheel is then likely to exceed an allowable wheel speed on the basis of the durability of the differential gears 24F and 24R and the like. The allowable wheel speed may be, for example, a rotation speed difference between the front wheels 21a and 21b (axles 23a and 23b) of the differential gear 24F or a rotation speed difference between the rear wheels 21c and 21d (axles 23c and 23d) of the differential gear 24R and may be designed to be, for example, 120 km/h, 130 km/h or 140 km/h. According to the embodiment, the braking force is applied to the idling wheel by the hydraulic brake system 40. This suppresses an increase in the actual wheel speed of the idling wheel and thereby suppresses the actual wheel speed of the idling wheel from exceeding the allowable wheel speed.

As described above, in the case where the current state is the accelerator-off state and where the vehicle body speed V is equal to or lower than the reference value Vref, when the difference (|Nwf−Nwr|) between the front wheel average rotation speed Nwf and the rear wheel average rotation speed Nwr is equal to or smaller than the reference value Nwref, the electric vehicle 20 of the embodiment sets (resets) the vehicle body speed V, based on the lower between the front wheel average rotation speed Nwf and the rear wheel average rotation speed Nwr. This enables the vehicle body speed V to be set (reset) with high accuracy even at a very low vehicle body speed or at a vehicle stop. The electric vehicle 20 of the embodiment compares the respective values (Vwa−V), (Vwb−V), (Vwc−V) and (Vwd−V) obtained by subtracting the vehicle body speed V from the respective wheel speeds Vwa, Vwb, Vwc and Vwd of the front wheels 21a and 21b and of the rear wheels 21c and 21d with the reference value Vwref to determine whether each wheel out of the front wheels 21a and 21b and the rear wheels 21c and 21d idles. According to the embodiment, the vehicle body speed V can be set with high accuracy. This accordingly allows for determination of whether each wheel idles with high accuracy even at a very low vehicle body speed or at a vehicle stop.

Additionally, when some wheel out of the front wheels 21a and 21b and the rear wheels 21c and 21d idles, the braking force is applied to the idling wheel by the hydraulic brake system 40. This suppresses an increase in the actual wheel speed of the idling wheel and thereby suppresses the actual wheel speed of the idling wheel from exceeding the allowable wheel speed.

In the case where the current state is the accelerator-off state and where the vehicle body speed V is equal to or lower than the reference value Vref, when the difference (|Nwf−Nwr|) between the front wheel average rotation speed Nwf and the rear wheel average rotation speed Nwr is larger than the reference value Nwref, the electric vehicle 20 of the embodiment sets (resets) the vehicle body speed V, based on the lower between the front wheel average rotation speed Nwf and the rear wheel average rotation speed Nwr. According to a modification, however, even when the current state is the accelerator-on state or when the vehicle body speed V is higher than the reference value Vref, as long as the difference (|Nwf−Nwr|) is larger than the reference value Nwref, the vehicle body speed V may be set (reset), based on the lower between the front wheel average rotation speed Nwf and the rear wheel average rotation speed Nwr.

Figure 3:
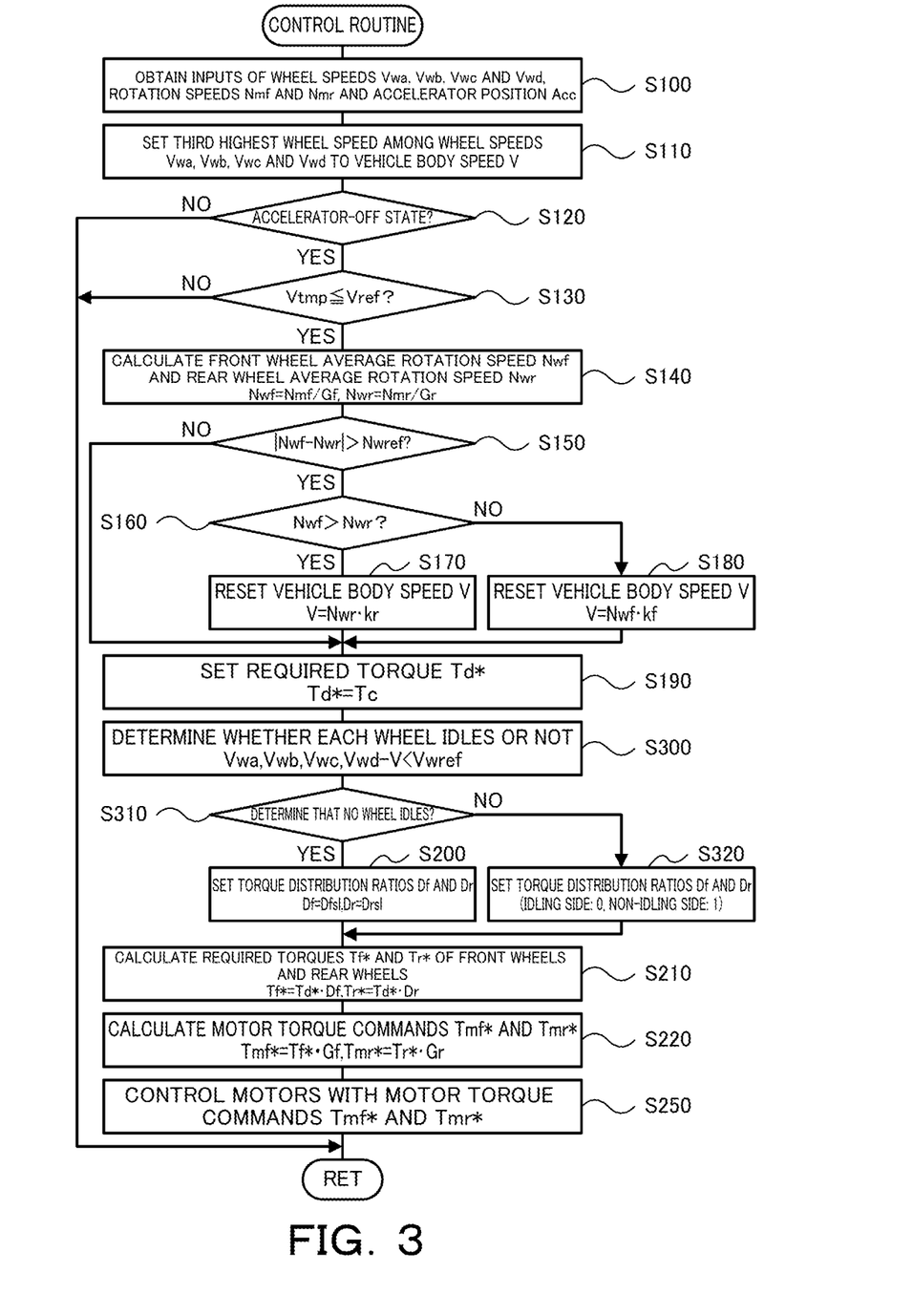
FIG. 3 is a flowchart showing another example of the control routine according to a modification.

In the electric vehicle 20 of the embodiment, the main ECU 50 performs the control routine of FIG. 2. According to a modification, however, the main ECU 50 may perform a control routine of FIG. 3. The control routine of FIG. 3 is similar to the control routine of FIG. 2, except the processing of steps S300 to S320 performed in place of the processing of steps S230, S240 and S260. Accordingly, the like processing steps are expressed by the like step numbers, and their detailed description is omitted.

In the control routine of FIG. 3, after setting the ordinary creep torque Tc to the required torque Td* at step S190, the main ECU 50 determines whether each wheel out of the front wheels 21a and 21b and the rear wheels 21c and 21d idles (steps S300 and S310), like the processing of steps S230 and S240 in the control routine of FIG. 2. When it is determined that no wheel out of the front wheels 21a and 21b and the rear wheels 21c and 21d idles, the main ECU 50 sets the values Dfs1 and Drs1 described above to the torque distribution ratios Df and Dr (step S200) and then performs the processing of and after step S210.

When it is determined at steps S300 and S310 that some wheel out of the front wheels 21a and 21b and the rear wheels 21c and 21d idles, on the other hand, the main ECU 50 sets the torque distribution ratios Df and Dr, such that the idling side which includes the idling wheel out of the front wheels 21a and 21b and the rear wheels 21c and 21d has a torque distribution ratio of 0 and that the non-idling side which does not include the idling wheel has a torque distribution ratio of 1 (step S320) and then performs the processing of and after step S210. Such control suppresses the torque from being output to the idling side, suppresses an increase in the actual wheel speed of the idling wheel and thereby suppresses the actual wheel speed of the idling wheel from exceeding the allowable wheel speed.

When it is determined that some wheel out of the front wheels 21a and 21b and the rear wheels 21c and 21d idles, this modification sets the torque distribution ratios Df and Dr such that the idling side has the torque distribution ratio of 0 and the non-idling side has the torque distribution ratio of 1. According to another modification, however, the hydraulic brake system 40 may be additionally controlled to apply a braking force to the idling wheel, like the processing of step S260 in the control routine of FIG. 2. This more effectively suppresses an increase in the actual wheel speed of the idling wheel and thereby more effectively suppresses the actual wheel speed of the idling wheel from exceeding the allowable wheel speed.

When it is determined that some wheel out of the front wheels 21a and 21b and the rear wheels 21c and 21d idles, this modification sets the torque distribution ratios Df and Dr such that the idling side has the torque distribution ratio of 0 and the non-idling side has the torque distribution ratio of 1. According to another modification, when the idling wheel belongs to the front wheels 21a and 21b, the main ECU 50 may set a value Df2 that is larger than the value 0 but that is smaller than the value Dfs1, to the torque distribution ratio Df and set a value obtained by subtracting the value Df2 from the value 1, to the torque distribution ratio Dr. When the idling wheel belongs to the rear wheels 21c and 21d, on the other hand, the main ECU 50 may set a value Dr2 that is larger than the value 0 but that is smaller than the value Drs1, to the torque distribution ratio Dr and set a value obtained by subtracting the value Dr2 from the value 1, to the torque distribution ratio Df. In this modification, the value Df2 and the value Dr2 may be determined by experiment or by analysis by taking into account the inertia of the idling side, such that the actual wheel speed of the idling wheel does not exceed the allowable wheel speed.

Figure 4:
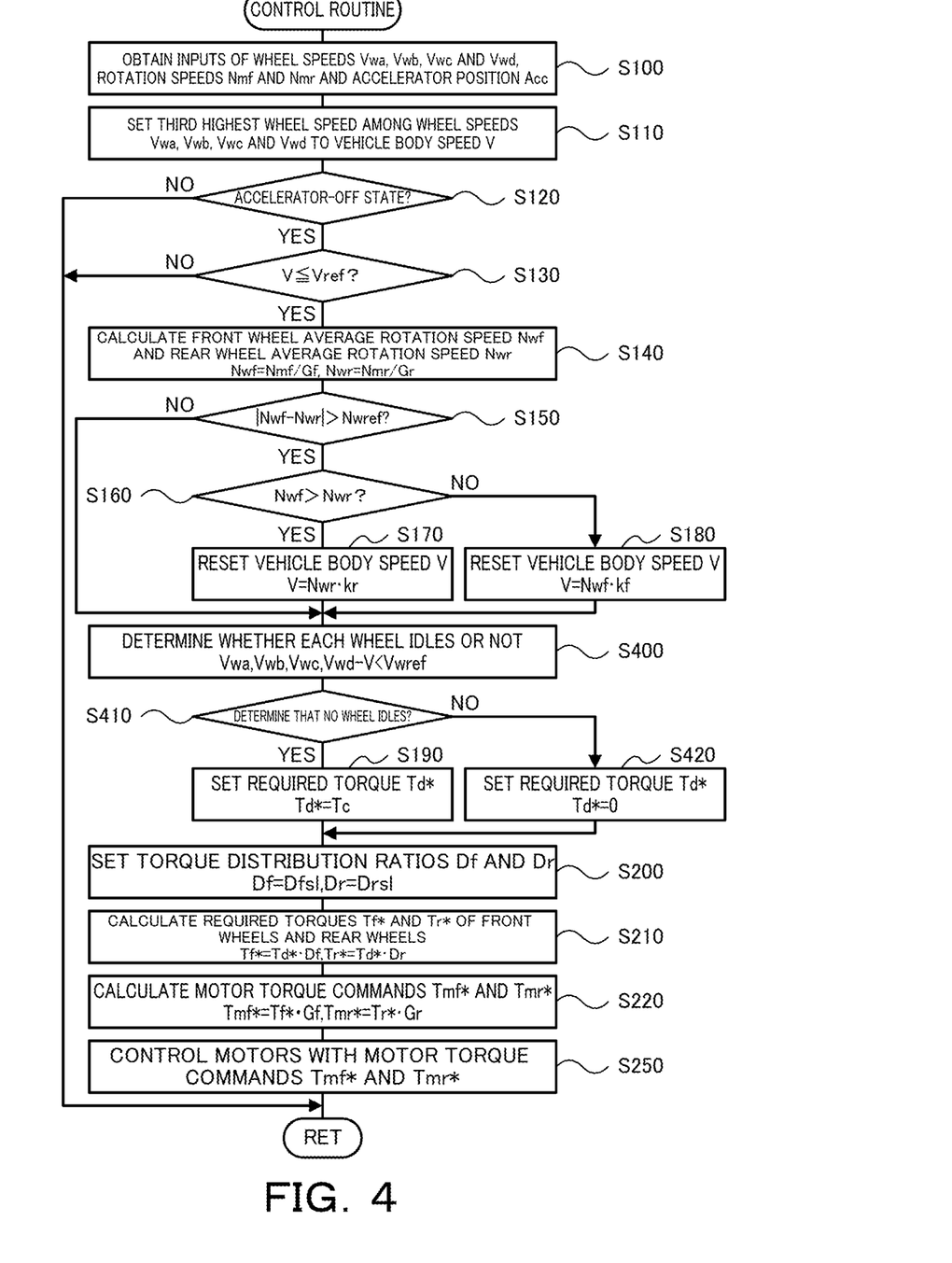
FIG. 4 is a flowchart showing another example of the control routine according to another modification.

In the electric vehicle 20 of the embodiment, the main ECU 50 performs the control routine of FIG. 2. According to another modification, the main ECU 50 may perform a control routine of FIG. 4. The control routine of FIG. 4 is similar to the control routine of FIG. 2, except the processing of steps S400 to S420 performed in place of the processing of steps S230, S240 and S260. Accordingly, the like processing steps are expressed by the like step numbers, and their detailed description is omitted.

In the control routine of FIG. 4, when determining that the difference (|Nwf−Nwr|) is equal to or smaller than the reference value Nwref at step S150 or after resetting the vehicle body speed V at step S170 or at step S180, the main ECU 50 determines whether each wheel out of the front wheels 21a and 21b and the rear wheels 21c and 21d idles (steps S400 and S410), like the processing of steps S230 and S240 in the control routine of FIG. 2. When it is determined that no wheel out of the front wheels 21a and 21b and the rear wheels 21c and 21d idles, the main ECU 50 sets the ordinary creep torque Tc to the required torque Td* (step S190) and then performs the processing of and after step S200.

When it is determined at steps S400 and S410 that some wheel out of the front wheels 21a and 21b and the rear wheels 21c and 21d idles, on the other hand, the main ECU 50 sets value 0 to the required torque Td* (step S420) and then performs the processing of and after step S200. Such control suppresses the torque from being output to the idling side and the non-idling side, suppresses an increase in the actual wheel speed of the idling wheel and thereby suppresses the actual wheel speed of the idling wheel from exceeding the allowable wheel speed.

When it is determined that some wheel out of the front wheels 21a and 21b and the rear wheels 21c and 21d idles, this modification sets the value 0 to the required torque Td*. According to another modification, however, the hydraulic brake system 40 may be additionally controlled to apply a braking force to the idling wheel, like the processing of step S260 in the control routine of FIG. 2. This more effectively suppresses an increase in the actual wheel speed of the idling wheel and thereby more effectively suppresses the actual wheel speed of the idling wheel from exceeding the allowable wheel speed.

When it is determined that some wheel out of the front wheels 21a and 21b and the rear wheels 21c and 21d idles, this modification sets the value 0 to the required torque Td*. According to another modification, a creep torque Tc2 that is smaller than the ordinary creep torque Tc but that is larger than the value 0 may be set to the required torque Td*. In this modification, the creep torque Tc2 may be determined by experiment or by analysis by taking into account the inertia of the idling side, such that the actual wheel speed of the idling wheel does not exceed the allowable wheel speed.

The electric vehicle 20 of the embodiment uses the battery 36 as the power storage device. The power storage device used may be a capacitor, in place of the battery 36.

Figure 5:
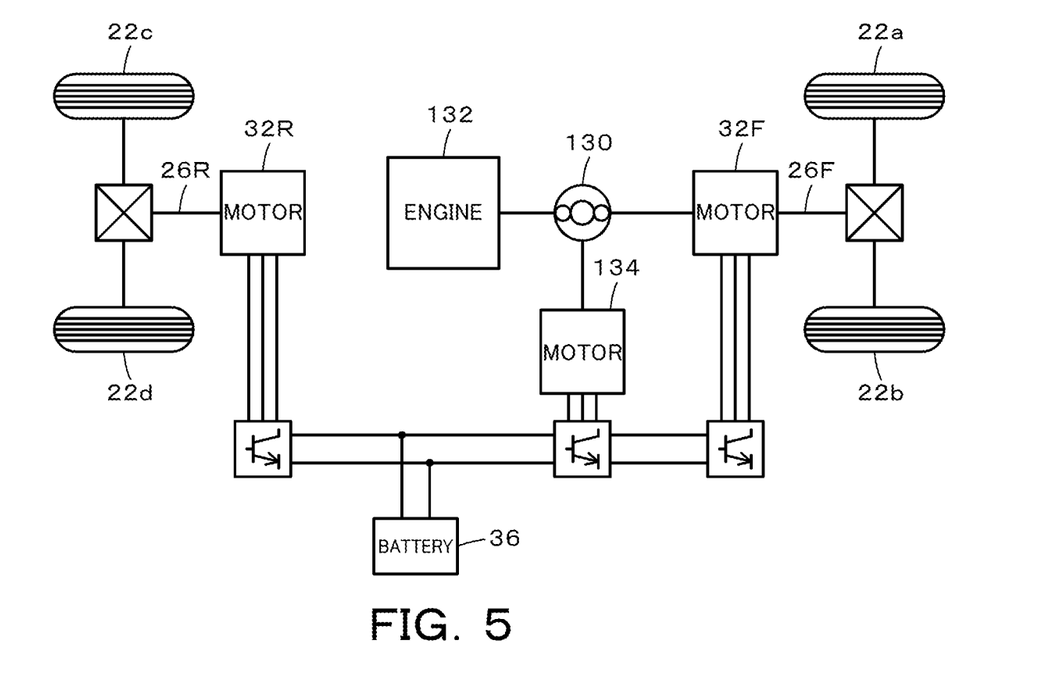
FIG. 5 is a configuration diagram illustrating the schematic configuration of a hybrid vehicle according to a modification.
Figure 6:
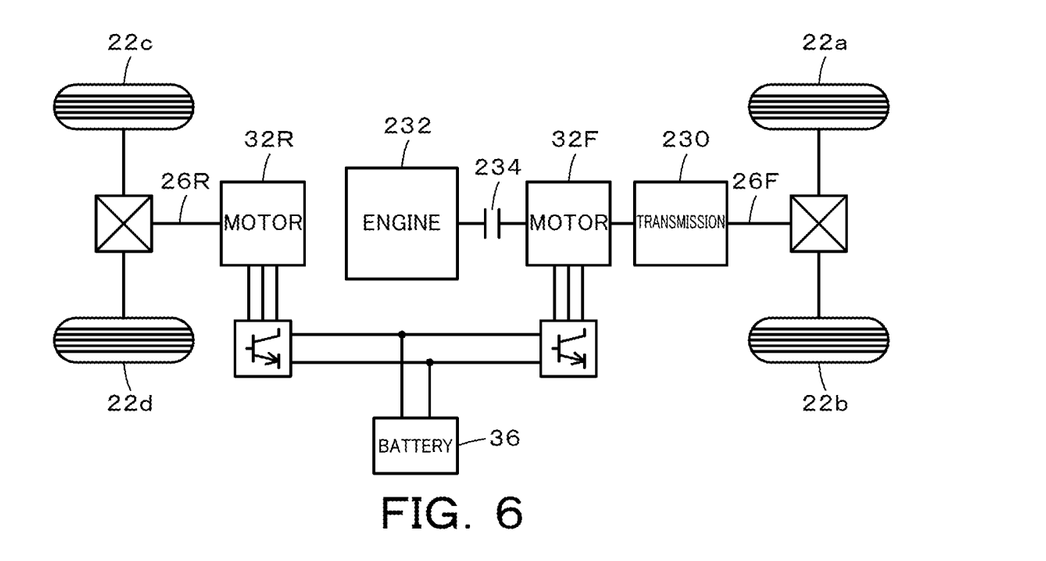
FIG. 6 is a configuration diagram illustrating the schematic configuration of a hybrid vehicle according to another modification

The above embodiment describes the application of the present disclosure to the electric vehicle 20 configured such that the motor 32F is connected with the driveshaft 26F which is coupled with the front wheels 21a and 21b via the differential gear 24F and that the motor 32R is connected with the driveshaft 26R which is coupled with the rear wheels 21c and 21d via the differential gear 24R. The present disclosure may be applied to a hybrid vehicle 120 configured such that an engine 132 and a motor 134 are connected with the driveshaft 26F via a planetary gear 130, in addition to the configuration of the electric vehicle 20, as shown in FIG. 5. The present disclosure may also be applied to a hybrid vehicle 220 configured such that a transmission 230 is provided between the driveshaft 26F and the motor 32F and that an engine 232 is connected with the motor 32F via a clutch 234, in addition to the configuration of the electric vehicle 20, as shown in FIG. 6.

In the motor vehicle of this aspect, when it is determined that some wheel out of the respective wheels idles, the control device may perform wheel speed suppressing control that suppresses an increase in actual wheel speed of an idling wheel that is a wheel which idles. This configuration suppresses an increase in the actual wheel speed of the idling wheel and thereby suppresses the actual wheel speed of the idling wheel from exceeding an allowable wheel speed on the basis of the durability of the differential gears and the like.

In the motor vehicle of the above aspect configured to perform the wheel speed suppressing control when it is determined that some wheel out of the respective wheels idles, the control device may further include a braking force applying device configured to apply a braking force to each wheel. The control device may controls the braking force applying device, such as to apply a braking force to the idling wheel, during execution of the wheel speed suppressing control. This configuration applies the braking force to the idling wheel and thereby suppresses an increase in the actual wheel speed of the idling wheel.

In the motor vehicle of the above aspect configured to perform the wheel speed suppressing control when it is determined that some wheel out of the respective wheels idles, the control device may control the first motor and the second motor, such as to provide a lower torque ratio of an idling side which includes the idling wheel out of the front wheels and the rear wheels, to a vehicle total torque and provide a higher torque ratio of a non-idling side which does not include the idling wheel, to the vehicle total torque, during execution of the wheel speed suppressing control, compared with the torque ratios of the idling side and of the non-idling side during non-execution of the wheel speed suppressing control. This configuration reduces the torque of the idling side including the idling wheel out of the front wheels and the rear wheels and thereby suppresses an increase in the actual wheel speed of the idling wheel. The control device may controls the first motor and the second motor, such as to provide a value 0 to the torque ratio of the idling side which includes the idling wheel, to the total torque, during execution of the wheel speed suppressing control. This configuration more effectively suppresses an increase in the actual wheel speed of the idling wheel.

In the motor vehicle of the above aspect configured to perform the wheel speed suppressing control when it is determined that some wheel out of the respective wheels idles, when the vehicle body speed is equal to or lower than a predetermined vehicle body speed and it is determined that some wheel out of the respective wheels idles, the control device may control the first motor and the second motor, such as to provide a smaller creep torque during execution of the wheel speed suppressing control, compared with a creep torque during non-execution of the wheel speed suppressing control. This configuration reduces the creep torque and thereby suppresses an increase in the actual wheel speed of the idling wheel. In this modification, the control device may control the first motor and the second motor, such as to provide a value 0 to the creep torque during execution of the wheel speed suppressing control. This configuration suppresses an increase in the actual wheel speed of the idling wheel.

The following describes the correspondence relationship between the primary components of the embodiment and the primary components of the disclosure described in Summary. The motor 32F of the embodiment corresponds to the "first motor", the motor 32R corresponds to the "second motor", the wheel speed sensors 22a, 22b, 22c and 22d correspond to the "wheel speed detector", the rotational position detection sensors 33F, 33R and main ECU 50 correspond to the "a rotation speed detector", the main ECU 50 and brake ECU 48 correspond to the "control device" and the hydraulic brake system 40 corresponds to the "braking force application device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the motor vehicle and so on.

The invention claimed is:

1. A motor vehicle, comprising:
a first motor connected with left and right front wheels via a first differential gear;
a second motor connected with left and right rear wheels via a second differential gear;
a wheel speed detector configured to detect a wheel speed of each wheel out of the left and right front wheels and the left and right rear wheels;
a rotation speed detector configured to allow for detection with higher accuracy up to a range having a smaller absolute value compared with the wheel speed detector and configured to detect rotation speeds of the first motor and of the second motor; and
a control device configured to control the first motor and the second motor, wherein
the control device sets a front wheel average rotation speed that is an average rotation speed of the left and right front wheels, based on the rotation speed of the first motor, and sets a rear wheel average rotation speed that is an average rotation speed of the left and right rear wheels, based on the rotation speed of the second motor,
when a difference between the front wheel average rotation speed and the rear wheel average rotation speed is larger than a first reference value, the control device sets a vehicle body speed, based on lower between the front wheel average rotation speed and the rear wheel average rotation speed, and the control device compares a difference between the wheel speed of each wheel and the vehicle body speed with a second reference value and thereby determines whether the wheel idles.

2. The motor vehicle according to claim 1,
wherein when it is determined that some wheel out of the respective wheels idles, the control device performs wheel speed suppressing control that suppresses an increase in actual wheel speed of an idling wheel that is a wheel which idles.

3. The motor vehicle according to claim 2, further comprising
a braking force applying device configured to apply a braking force to each wheel, wherein
the control device controls the braking force applying device, such as to apply a braking force to the idling wheel, during execution of the wheel speed suppressing control.

4. The motor vehicle according to claim 2,
wherein the control device controls the first motor and the second motor, such as to provide a lower torque ratio of an idling side which includes the idling wheel out of the front wheels and the rear wheels, to a vehicle total torque and provide a higher torque ratio of a non-idling side which does not include the idling wheel, to the vehicle total torque, during execution of the wheel speed suppressing control, compared with the torque ratios of the idling side and of the non-idling side during non-execution of the wheel speed suppressing control.

5. The motor vehicle according to claim 4,
wherein the control device controls the first motor and the second motor, such as to provide a value 0 to the torque ratio of the idling side which includes the idling wheel, to the total torque, during execution of the wheel speed suppressing control.

6. The motor vehicle according to claim 2,
wherein when the vehicle body speed is equal to or lower than a predetermined vehicle body speed and it is determined that some wheel out of the respective wheels idles, the control device controls the first motor and the second motor, such as to provide a smaller creep torque during execution of the wheel speed suppressing control, compared with a creep torque during non-execution of the wheel speed suppressing control.

7. The motor vehicle according to claim 6,
wherein the control device controls the first motor and the second motor, such as to provide a value 0 to the creep torque during execution of the wheel speed suppressing control.

* * * * *